F. WITTENMEIER.
MULTIPLE BALL VALVE.
APPLICATION FILED MAR. 31, 1919.
1,401,223.
Patented Dec. 27, 1921.
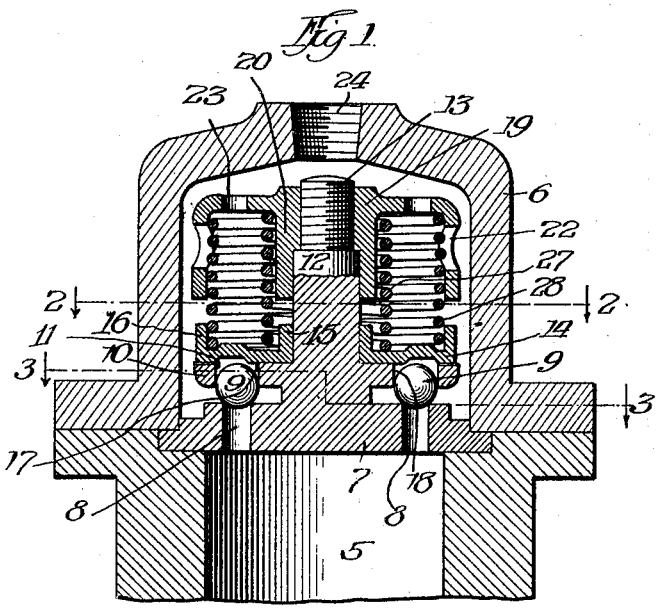
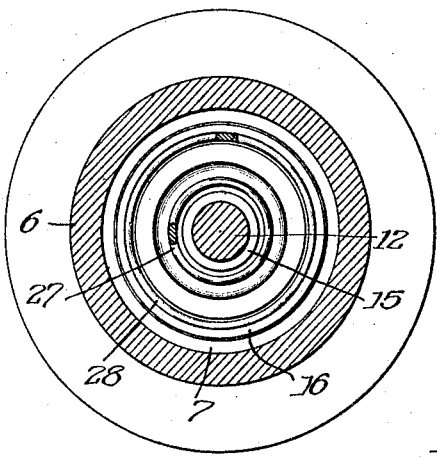
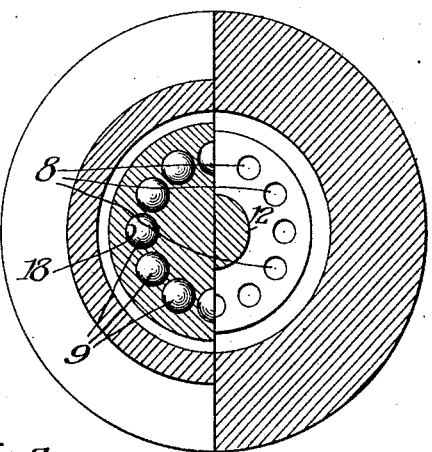
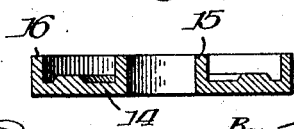
Inventor:
Fred Wittenmeier

UNITED STATES PATENT OFFICE.

FRED WITTENMEIER, OF CHICAGO, ILLINOIS.

MULTIPLE-BALL VALVE.

1,401,223.　　　　Specification of Letters Patent.　　Patented Dec. 27, 1921.

Application filed March 31, 1919. Serial No. 286,291.

*To all whom it may concern:*

Be it known that I, FRED WITTENMEIER, a citizen of the United States, residing at Chicago, in the county of Cook and State of Illinois, have invented certain new and useful Improvements in Multiple-Ball Valves, of which the following is a specification.

My invention relates to valves and particularly to reduction valves in which a plurality of ports are controlled by balls or the like.

In carrying out the preferred form of my invention I prefer to employ what I call a multiple ball valve adapted especially for use with pressure systems although the valve may be used with other types of mechanism requiring valves.

One of the objects of my invention is to provide a ball valve which will be efficient under all conditions of service including high speed service and which will operate efficiently with a minimum loss of the fluid under compression, the clearances being reduced to a minimum.

A further object is to provide a ball valve so arranged as to prevent the balls from being inoperatively displaced with respect to their seats, and also means for turning the balls to prevent the accumulation of dirt and to prevent wear at any particular point of the surface thereof.

A still further object is to provide a novel ball valve wherein the balls are guided so as to seat properly when the valves are to be closed and which rise and fall simultaneously, the return action being quick and snappy, the gases or fluids at the same time being given unobstructed passageways.

The above recited and other objects will be apparent by referring to the drawings, in which—

Figure 1 is a vertical sectional view of the preferred embodiment of my invention with only a part of the cylinder shown.

Fig. 2 is a horizontal section on line 2—2 of Fig. 1, and

Fig. 3 is a horizontal section on the irregular line 3—3 of Fig. 1.

Fig. 4 is a sectional view of a modified form of ball retaining ring.

In the drawings, the upper end of a cylinder 5 is shown. This cylinder may be a compression cylinder in which is reciprocably mounted a piston (not shown). A cap 6 is secured over the end of the cylinder 5 by any suitable fastening means (not shown) passing through the flanges of the cylinder and cap, as is common practice. The novel ball valve of my invention includes a seat member 7 overlying the end of the cylinder 5 and held in place thereon by the cap 6. The member 7 has a plurality of circumferentially arranged apertures 8 which form the valve openings, the walls of the upper ends of which openings serve as seats for ball valve members 9. Every one of the openings 8 has a ball 9 coöperating therewith to serve as a closure under normal conditions. Integral with the member 7 and overlying the outer ends of the apertures 8 is a shelf member 10 having circumferentially arranged apertures 11 therethrough which are concentric with the apertures 8 but greater in diameter. The diameters of the openings 11 are but slightly greater than the diameters of the balls 9 the purpose of the shelf member and the enlarged openings 11 being to serve as guide means for the balls 9 as the same are moved under operating conditions, the shelf member acting to prevent the balls from being inoperatively displaced with respect to the seats so that on return of the balls to the seats of the valves there will be no chance of any of the valves remaining open during the downward or suction stroke of the piston. The member 7 has an upwardly projecting boss 12 with a reduced threaded end portion 13 for purposes hereinafter explained.

Slidably mounted on the boss 12 over the upper side of the shelf 10 I provide a ring 14 having upturned inside and outside flanges 15 and 16. Preferably the ring is provided with a circular groove or undercut offset portion 17 forming an annular shoulder 18 which is arranged with respect to the balls 9 so as to be engaged by the balls as the same are moved upwardly under pressure of the fluid in the cylinder 5. As the balls encounter the shoulder 18 they will be turned slightly causing any dirt thereon to be rubbed off by frictional action and also causing different parts of the ball to cover the apertures when the balls move into engagement with their seats upon return to valve closing position. In this way the surface of the balls is maintained smooth for preventing leakage therethrough. In screw threaded engagement with the reduced end 13 of the boss 12 is a cap member 19 having downwardly extending annular sides 20 and 21, as shown in the drawings. Surrounding the central boss member 12 and confined within the walls 15 and 16 of the ring 14 and the walls 20 and 21 of the cap member 19, are two coiled springs 27 and 28 having different diameters and arranged at different radial distances from the boss 12. The cap 19 being secured in position by reason of its threaded engagement with the end 13, the springs serve to maintain the ring member 14 against the upper surface of the shelf 10 and may be adjusted to regulate the operation of the balls 9 to permit a fluid to flow through the apertures 8 as different conditions warrant, the adjustment being accomplished by turning the cap 19 on its threaded support. The upwardly extending walls 15 and 16 of the ball-retaining ring 14 and the downwardly extending walls or sides 20 and 21 of the cap 19 serve to limit the movement of the ring or cap, the usual adjustment being such that the ring 14 is prevented from being moved upwardly far enough to permit escape of the balls 9 and at the same time permitting the balls to function responsively to the kind of fluid and the amount of compression desired. The cap member 19 has a series of apertures 22 in the sides thereof and another series of apertures 23 in the upper ends thereof, through which the fluid may pass, there also being space between the members 14 and 19 and the cap 6 for the passage of a fluid. The cap member 6 has an opening 24 for the delivery of the gases from the compressor to the source of use.

The operation of the device is as follows: Under suction the parts are arranged as shown in Fig. 1. On compression, that is, when the piston (not shown) is moving upwardly the pressure of the fluid within the piston will tend to raise the balls 9 from engagement with their seats. A slight raising of the balls will permit escape of the fluid through the apertures to the outside of the cap and ring members. Further, the compression will force the balls against the bottom and side of the ring 14 and raise the same against the action of the springs 27 and 28 permitting a further opening of the valves. The upward movement of the ring 14 is limited by engagement between the annular flanges on the ring 14 and cap 19, the greatest distance between said flanges lengthwise of the cylinder being less than the radius of the balls 9 to prevent inoperative displacement of same. As before stated, when the balls encounter the shoulder 18, the balls are caused to rotate so that they are maintained in clean condition and when returned to their valve seats a different portion of the surface of the balls will be presented, thus reducing wear of the balls to a minimum. During all operative movements of the balls they are retained in and guided by the guide apertures 11 in the shelf member 10 permitting full opening of the valves and at the same time being prevented from inoperative displacement by reason of the ring 14. When the valves are fully opened the fluid escapes in an unobstructed manner through the apertures 8 and that which passes up under the cap 19 escapes through the openings 22 and 23, eventually all of the escaping fluid passing out from the cap member 6 through the opening 24 in the end of said cap member 6. On reduction of pressure, the springs partially return the balls to reseating position, the final closing of the valves being by gravity as will be observed in Fig. 1.

By my invention I have provided a ball valve wherein it is possible to control the movement of the balls to prevent displacement in fully opened position and to guide the same in all of their movements and causing accurate reseating of same, the valve being especially valuable in high speed work. I have also provided means for reducing the wear on the balls by rotating the same presenting new surface to the seats from time to time, the closing of the valves being efficient and at the same time the clearances are reduced to a minimum.

In Fig. 4 I have shown a ball retaining ring with its under or ball engaging side flat in which form the balls would not necessarily be rotated as hereinabove described when a ring having the annular shoulder 18 is employed.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In a valve of the class described, the combination of a seat member having a plurality of valve openings therein, a plurality of balls for closing said openings, and means for rotating said balls as the same are moved from closing to open position.

2. In a ball valve, the combination of a seat member having a valve opening therethrough, a ball valve for closing said opening, a guide adapted to direct said ball valve into seating position in said opening, and a stop member engaged by said ball valve to prevent the latter from being dislodged from said guide member, said stop member comprising means for rotating said ball valve as it is moved from closing to open position.

3. In a ball valve, the combination with a seat member having a plurality of openings therethrough, a plurality of ball valves for closing said openings, a guide formed integrally with said seat member and having openings therethrough to guide the ball valves in their movements toward and away from said seat member, a stop member surrounding a concentric reduced portion on said seat member to limit the movement of the ball valves from said seat member, an annular cap member secured to the upper end of said reduced portion of said seat member, springs interposed between said stop member and cap member, and annular flanges on said stop member and cap member surrounding said reduced portion of the seat member for serving as stops to limit the movement of said stop member.

4. In a ball valve, the combination of a seat member, having a valve opening, a ball for closing said opening, a guide adapted to direct said ball into seating position in said opening, and a spring controlled movable stop member adapted to prevent said ball from being dislodged with respect to said guide member, a cap member carried by an extension of said seat member having downwardly extending portions for surrounding the springs engaging the movable stop member whereby to maintain said springs in operative position with respect to said stop and to serve for limiting the upward movement of said movable stop member.

Signed at Chicago, Illinois, this 17th day of March, 1919.

FRED WITTENMEIER.